United States Patent [19]
Piccone et al.
[11] 3,713,101
[45] Jan. 23, 1973

[54] THYRISTOR TURN-ON CIRCUIT

[75] Inventors: Dante E. Piccone, Philadelphia; Istvan Somos, Lansdowne, both of Pa.
[73] Assignee: General Electric Company

[22] Filed: May 19, 1971
[21] Appl. No.: 144,840

[52] U.S. Cl. ...........340/147 R, 307/252 L, 307/284, 343/225
[51] Int. Cl. ..........................H03k 17/00, H04q 9/00
[58] Field of Search......315/149, 155, 156, 158, 159, 315/205, 274; 321/2, 27, 8, 11; 307/117, 140, 129, 252, 252 R, 252 L, 284

[56] References Cited

UNITED STATES PATENTS

| | | | |
|---|---|---|---|
| 3,530,357 | 9/1970 | Leowald | 321/2 |
| 3,526,824 | 9/1970 | Leowald | 321/2 |
| 3,486,103 | 12/1969 | Boksjo | 321/27 R X |
| 3,593,103 | 7/1971 | Chandler | 321/27 |
| 3,522,509 | 8/1970 | Hasenbalg | 321/2 |
| 3,643,260 | 2/1972 | Clarke | 307/284 X |

*Primary Examiner*—Donald J. Yusko
*Attorney*—J. Wesley Haubner, Barry A. Stein, Frank L. Neuhauser, Oscar B. Waddell and Joseph B. Forman

[57] ABSTRACT

A triggering circuit is provided for supplying trigger signals to the gate of a high voltage controlled rectifier. The triggering circuit includes a transmitting antenna connected to a pulse train generator and electromagnetically coupled, via a dielectric medium, to a receiving antenna. The receiving antenna is coupled to the gate of the controlled rectifier for providing energy pulses thereto. A feedback winding is connected in parallel with the transmitting antenna.

8 Claims, 3 Drawing Figures

PATENTED JAN 23 1973 3,713,101

INVENTORS:
DANTE E. PICCONE,
ISTVAN SOMOS,
BY Barry A. Stein
ATTORNEY

THYRISTOR TURN-ON CIRCUIT

BACKGROUND AND OBJECTS OF THE INVENTION

This invention relates to means for triggering semiconductor controlled rectifiers, and more particularly it relates to triggering means for high voltage controlled rectifiers wherein said triggering means is electrically insulated from the controlled rectifiers' main electrodes.

There is a growing demand for solid state devices capable of switching and controlling large amounts of electric power in static converters and related apparatus. Such devices are popularly referred to as semiconductor controlled rectifiers, thyristors, or SCR's. High power thyristors are commonly constructed with a broad area silicon wafer, having three back-to-back PN (rectifying) junctions, hermetically sealed in a housing including a ceramic sleeve and a pair of conductive terminals which contact the wafer and cap the respective ends of the sleeve. These terminals form the main electrodes of the device, i.e., one of the terminals forms the anode and the other terminal forms the cathode. The device is also equipped with a control electrode or other suitable gating means for control purposes.

As is known in the art a thyristor will block the passage of current between its anode and cathode until triggered or "fired" by the application to its gate of a control signal above a small threshold value at a time when the anode voltage is positive with respect to the cathode, whereupon it abruptly switches to a conducting state.

The control signal is commonly supplied to the thyristor by triggering means connected between its gate and its cathode. In high voltage applications the potential of the cathode may be at least several thousand volts with respect to ground. Since the triggering means used to provide the trigger signals operates at relatively low control voltage levels (e.g., 10 volts), troublesome problems can arise in insulating the gate (which is at approximately the same potential as the cathode) from the low voltage triggering means.

Accordingly, it is desirable to provide a triggering circuit which is electrically insulated from the gate of a high voltage controlled rectifier. One approach to accomplish such insulation is to utilize a light actuated firing system to initiate the triggering process. This approach is shown on page 292 of the book entitled "Semiconductor Controlled Rectifiers" by F.E. Gentry et al, published in 1964 by Prentice-Hall, Englewood Cliffs, N.J. Our invention provides another approach to the triggering of controlled rectifiers.

Accordingly, it is a main object of our invention to provide novel means for rendering high voltage controlled rectifiers conductive, said means being electrically insulated from the gates of said rectifiers.

It is a further object of our invention to provide means for rendering high voltage controlled rectifiers conductive by the application of energy to their gates, said energy being produced by a triggering circuit which is isolated from said gates.

SUMMARY OF THE INVENTION

In accordance with one aspect of our invention a triggering circuit is provided for rendering a high voltage controlled rectifier conductive by the application of a plurality of energy pulses to its gate. The triggering circuit is electrically insulated from the rectifier gate by a dielectric medium. To that end the trigger circuit comprises a controllable pulse train generator, which upon command produces a burst of energy pulses. The pulses are transmitted by a transmitting antenna through a dielectric medium to a receiving antenna, from which they are coupled to the gate of the controlled rectifier to render it conductive.

In accordance with another aspect of our invention a magnetic core is disposed about a main electrode of the controlled rectifier. A toroidal winding is provided about the core and is connected in parallel with the transmitting antenna. When arranged in this manner, upon the initiation of current conduction through the controlled rectifier, current is induced in the toroidal winding and is coupled to the transmitting antenna to thereby provide additional energy for the gate of the controlled rectifier.

DETAILED DESCRIPTION OF THE PREFERRED EMBODIMENTS

Figure 1:
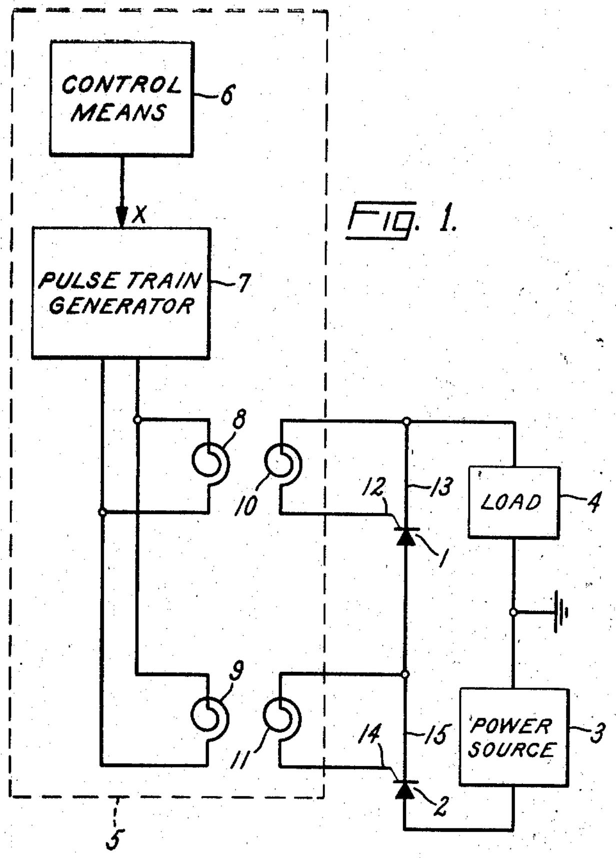
FIG. 1 is a schematic diagram of a trigger circuit in accordance with our invention for providing gate signals to the gates of a pair of serially connected, high-voltage, controlled rectifiers which are connected between a high voltage power source and a load.

In FIG. 1 there is schematically shown a high voltage power circuit. It is a common practice in power equipment to utilize plural serially connected controlled rectifiers for a high voltage capability (the number of such rectifiers is dependent upon the desired voltage handling capability). For the sake of simplicity, in FIG. 1 only two of controlled rectifiers (i.e., thyristors) 1 and 2 are shown connected in series with one another between a high voltage power source 3 and a load 4. Conventional reverse voltage protecting and transient voltage dividing "snubber circuits" are connected in shunt with each controlled rectifier, although they are not shown in the figure. A trigger circuit 5 is provided to supply gate signals to the rectifiers to render them conductive upon command. As can be seen the trigger circuit includes a control means 6, a pulse train generator 7, a pair of parallel connected loop antennae 8 and 9, and a second pair of loop antennae 10 and 11. Loop antenna 10 is connected between the gate 12 and the cathode electrode 13 of the rectifier 1 and the loop antenna 11 is connected between the gate 14 and the cathode electrode 15 of the rectifier 2.

It should be appreciated that in a series string of non-conducting controlled rectifiers connected between a high voltage source and ground, the potential on the gate of each rectifier will be equal to the potential of the source minus the voltage drop(s) across the rectifier(s) between it and the source. The gate potential on each of these serially connected rectifiers will be quite high. For example, in the circuit shown in FIG. 1 if it is assumed that the source is at a potential of 10,000 volts positive with respect to ground, the potential on the gate of rectifier 2 will be at approximately 10,000 volts positive and the potential on the gate of rectifier 1 will be at approximately 5,000 volts positive.

Since the pulse train generator 7 of trigger circuit 5 is normally at a relatively low potential relative to ground (e.g., 110 volts or less), insulation between the gates of the controlled rectifiers and the low voltage pulse train generator is a matter of utmost importance.

Our trigger circuit arrangement provides sufficient insulation between the low voltage trigger signal generating means and the rectifier gates in a simple and relatively inexpensive manner. This is accomplished by utilizing a pair of spaced loop antennae as the means for carrying the trigger signals from the low voltage trigger signal generating means to the gate of the rectifier.

As can be seen in FIG. 1 rectifier 1 has associated therewith loop antennae 8 and 10 and rectifier 2 has associated therewith loop antennae 9 and 11. The function of loop antennae 8 and 9 is to transmit gate signals produced by generator 7 through a dielectric medium to the respective spaced receiving antennae 10 and 11, from whence said signals are supplied to the gates of the respective rectifiers 1 and 2 to render them conductive. In most cases the dielectric medium in the space between the transmitting and receiving antennae will be air although other media may be used.

The pulse train generator is designed to produce a burst of energy pulses upon receipt of a command signal X from the control means 6. The frequency of the pulses in the burst may be within either the audio or the radio frequency ranges (preferably the individual pulses should be of 1 microsecond or less duration). The pulses may either be of unipolarity or of alternating polarity. If the pulses are of alternating polarity, it is particularly desirable to utilize a controlled rectifier which is capable of being triggered by either positive or negative energy pulses, although controlled rectifiers which can only be triggered by positive pulses can also be used. The former type of controlled rectifier is shown and claimed in U.S. Pat. No. 3,489,962-McIntyre et al. which is assigned to the same assignee as our invention.

Figure 2:
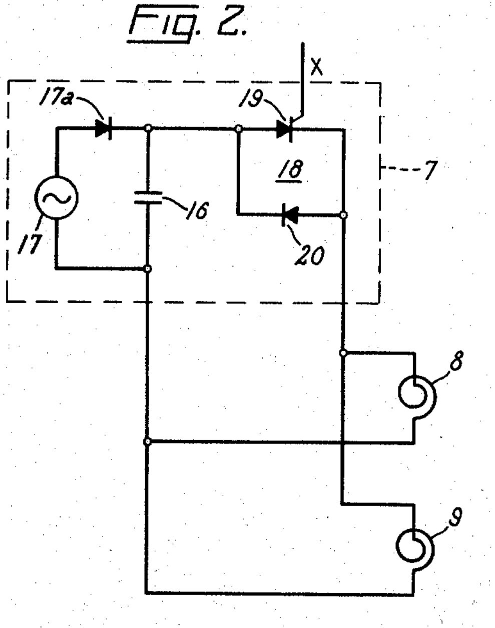
FIG. 2 is a schematic diagram of a particular pulse train generator utilized in our trigger circuit.

FIG. 2 is a schematic diagram of a circuit which may be used to form the pulse train generator 7. As can be seen that circuit includes an energy storage device or capacitor 16 connected to a source of voltage 17. The capacitor 16 is charged from the source via diode **17*a*. The bidirectional switch 18 is connected between the energy storage device and the parallel connected transmitting loop antennae 8 and 9. As should be appreciated, the energy storage device and the loop antenna form an oscillatory circuit. When the capacitor is in a charged condition, closure of the switch 18 will result in the discharge of current from the capacitor through the loop antenna thereby producing energy oscillations therein for transmission to the receiving antennae. The frequency of these oscillations is dependent upon the capacitance and the inductance of the oscillatory circuit. As shown, the switch includes a thyristor 19 and a reverse-poled, shunt diode 20. The thyristor is rendered conductive upon receipt of a command signal X from the control means 6. The turn-off time of this thyristor should be such that once triggered it remains conductive for a time sufficient to allow several pulses or oscillations to occur. The reverse-poled diode 20** enables the oscillations to continue by allowing the negative polarity oscillations to pass through the switch.

Figure 3:
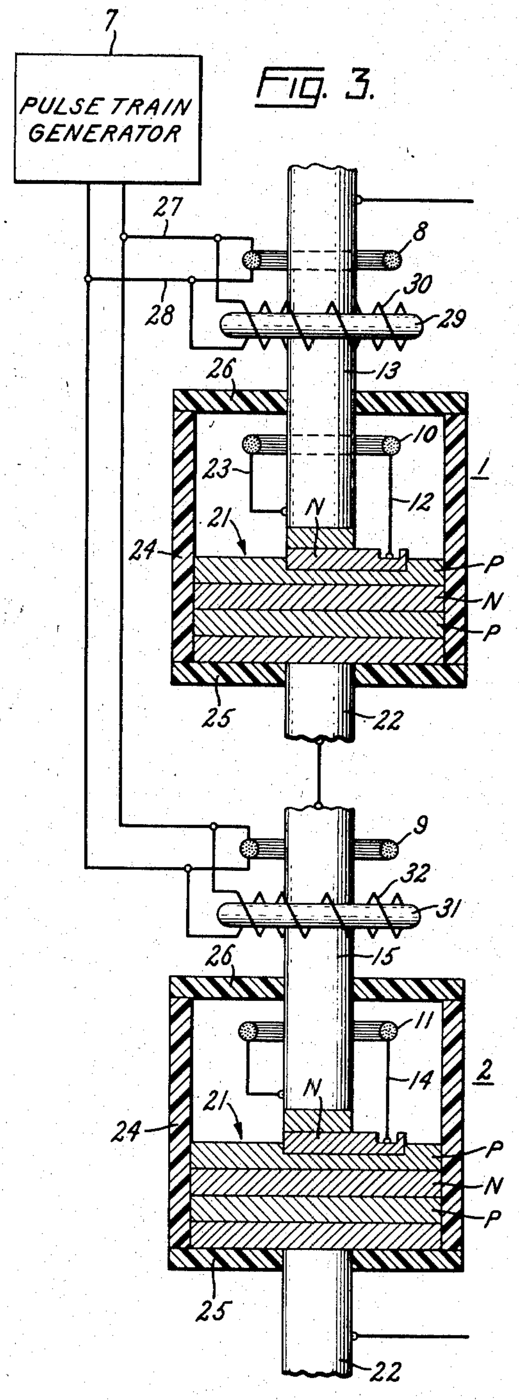
FIG. 3 is a cross-sectional view of a pair of controlled rectifiers which are provided with gate signals by a trigger circuit in accordance with our invention.

FIG. 3 is a schematic diagram of a portion of the components shown schematically in FIG. 1. In particular, FIG. 3 shows an expeditious arrangement of the transmitting and receiving loop antennae with respect to their associated controlled rectifiers 1 and 2. Triggering pulse feed-back means are also shown in this figure. The function of such feed-back means will be discussed later.

The controlled rectifiers 1 and 2 are shown in schematic form in FIG. 3 and are exemplary of a rectifier construction in which the receiving loop antenna is accommodated within the rectifier's housing. By utilizing such a construction the receiving antenna becomes an integral part of the rectifier unit and its connection between the cathode and the gate is greatly simplified.

Since the construction of each controlled rectifier and associated loop antennae is the same and since each controlled rectifier is provided with gate signals from a common pulse train generator it will be unnecessary to describe in detail the construction of both the rectifiers and the associated antennae. Accordingly, only rectifier 1 in associated antennae 8 and 10 will be discussed.

As can be seen rectifier 1 comprises a semiconductor body or wafer 21 composed of plural layers of alternate P and N type conductivity disposed between a pair of main electrodes, namely the anode electrode 22 and the cathode electrode 13. The alternate conductive layers are preferably constructed and arranged in accordance with teachings of the above noted McIntyre et al patent. A gate lead 12 is connected to a layer of N type conductivity and to one end of the loop antenna 10. The other end of the loop end antenna 10 is connected via lead 23 to the cathode electrode 13. Each of the antennae are preferably constructed of a plurality of electrically conductive turns.

The rectifier wafer and the receiving loop antenna are disposed in a sleeve 24. Cap members are provided 25 and 26 to close the sleeve openings around the main electrodes. This construction forms an integral, sealed, controlled rectifier unit having no external gate connections. The sleeve and cap members are preferably made of insulative material since a metal rectifier housing would tend to shield the receiving antenna from the transmitted energy pulses.

The transmitting antenna 8 associated with rectifier 1 consists of a plurality of electrically conductive turns which encircle the cathode electrode 13. A pair of leads 27 and 28 connect the loop antenna to the pulse train generator 7. To achieve maximum coupling between the transmitting antenna and the receiving antenna the transmitting antenna is preferably disposed in a plane parallel to the plane of the receiving antenna. When arranged in this manner the burst of energy pulses created be generator 7 will be transmitted from loop antenna 8 through the surrounding dielectric medium and the insulating rectifier housing to the receiving antenna 10. The voltage induced in the receiving loop antenna will result in the provision of sufficient gate current to the rectifier to thereby render it conductive.

In one practical embodiment of our invention the following parameters were used:

| Components | Approximate Value |
|---|---|
| Pulse train generator **7** | |
| A.C. source **17** | 110 volts, 60 hz. |
| Capacitor **16** | .025 uf |
| diode **20** | G.E. IN538 |
| thyristor **19** | G.E. C137 |
| Transmitting antenna **8** | 5.5 uh |
| Receiving antenna **10** | 18 uh |
| Controlled Rectifier **1** | G.E. 6RW59 |
| Load **4** | 150 w bulb |
| Power Source **3** | 110 volts, 60 hz. |

In the above example only a single controlled rectifier was used and the control means 6 comprised a unijunction transistor oscillator whose output signal X was in synchronism with the power source 3. The spacing between the two loop antenna was 2 inches or less and the dielectric medium was air.

In accordance with another aspect of our invention we provide feed-back means which serve to provide additional triggering current to the gate of the controlled rectifiers. As can be seen in FIG. 3 a toroidal core 29, made of a magnetizable material, is provided about main electrode 13 of rectifier 1. A multi-turn winding 30 is wound about that core and is connected in parallel with the transmitting antenna 8. In a similar manner a toroidal core 31, having a winding 32 wound thereon and connected in parallel with the transmitting antenna 9, is provided about main electrode 15 of rectifier 2.

Operation of the feed-back triggering means is as follows: As current conduction between the anode and cathode of the rectifier commences (as a result of the provision of gate signals from the pulse train generator via the associated transmitting and receiving antennae) a voltage is induced in the magnetically coupled toroidal winding. Since the toroidal winding is connected in parallel with the transmitting antenna the voltage induced therein is coupled through the dielectric medium to the receiving antenna to provide additional triggering energy to the rectifier's gate. Accordingly, with our feedback triggering scheme once a rectifier begins to turn on, successful turn on is assured by the additional gate energy provided via the feed-back toroidal winding.

Furthermore, since the transmitting antennae associated with the rectifiers are connected in parallel with one another, if one rectifier should begin to conduct before a serially connected rectifier, the rising current through the first on rectifier will be fed, via its feedback toroidal winding, to the transmitting antenna associated with the later on rectifier to aid it in turning on. For example, if rectifier 1 should turn on before rectifier 2, the rising current through the former rectifier will induce the voltage in its associated feed-back winding 30 which will be coupled to the parallel connected transmitting antenna 9 of rectifier 2, whereby that rectifier will be provided with gate energy to expedite its turn on process.

It should be apparent to those skilled in the art that the pulse train generator for use with our feedback triggering scheme should be constructed to appear as an open circuit between bursts of energy pulses, so as to preclude loading of the toroidal winding-created, feedback signals. With the receiving antenna disposed inside the rectifier housing the distance d1 between the receiving antenna and the semiconductor wafer 21 should be sufficiently large (e.g., 5mm) in order to minimize the creation of transmitted energy eddy currents in the wafer since such eddy currents decrease the efficiency of energy transmission between the transmitting and receiving antennae. Furthermore, the diameter of the receiving antenna should be such that a sufficiently large distance *d*2 (e.g., 5 mm) separates the receiving antenna from the surface of the rectifiers' cathode in order to minimize the creation of eddy currents in portions of the cathode adjacent its surface.

It should also be apparent to those skilled in the art that the receiving antenna need not be enclosed in the rectifier housing. Rather, it may be disposed outside the housing so long as it is electrically connected between the rectifier's gate and its cathode. By utilizing an exterior receiving antenna the problem of transmission shielding is obviated and therefore the rectifier's semiconductor wafer may be enclosed within a housing having metallic parts.

While we have shown and described a particular embodiment of our invention, it will be obvious to those skilled in the art that various other changes and modifications may be made without departing from our invention in its broader aspects; and we, therefore, intend herein to cover all such changes and modifications as fall within the true spirit and scope of our invention.

What we claim as new and desire to secure by Letters Patent of the United States is:

1. A trigger circuit for providing gate signals to the gate of a high voltage controlled rectifier comprising:

a. a controllable pulse train generator adapted for providing, on command, a burst of energy pulses;

b. a transmitting antenna connected to said pulse train generator and adapted for transmitting said pulses;

c. a receiving antenna coupled to the gate of said controlled rectifier and adapted for receiving said pulses, said receiving antenna being spaced from said transmitting antenna and being electromagnetically coupled thereto via a dielectric medium, whereby said gate is energized by said received pulses, which render said controlled rectifier conductive.

2. A trigger circuit as specified in claim 1 wherein said controlled rectifier comprises a semiconductor wafer disposed within a sealed housing and wherein said receiving antenna is disposed within said sealed housing.

3. A trigger circuit as specified in claim 1 wherein said pulses alternate in polarity and wherein said controlled rectifier is capable of being rendered conductive by either positive or negative gate signals.

4. A trigger circuit as specified in claim 1 wherein said antennae are loop antennae and wherein said pulse train generator comprises:

i. energy storage means adapted for connection to a voltage source; and ii. switch means connected between said energy storage means and said transmitting loop antennae; said energy storage means and said transmitting loop antenna forming an oscillatory circuit which upon closure of said switch means produces a burst of oscillatory pulses.

5. A trigger circuit as specified in claim 4 wherein said oscillatory pulses alternate in polarity and wherein said controlled rectifier is capable of being rendered conductive by either positive or negative gate signals.

6. A trigger circuit as specified in claim 1 wherein a toroidal magnetizable core is disposed about a main electrode of said controlled rectifier and wherein a winding is provided about said core and connected in parallel with said transmitting antenna.

7. A trigger circuit for providing gate signals to the gates of at least two serially connected high voltage controlled rectifiers comprising:

a. a controllable pulse train generator adapted for providing, on command, a burst of energy pulses;
b. a first transmitting antenna connected to said pulse train generator and adapted for transmitting said pulses;
c. a second transmitting antenna connected in parallel with said first antenna;
d. a first receiving antenna, coupled to the gate of a first controlled rectifier and electromagnetically coupled via a dielectric medium to said first transmitting antenna;
e. a second receiving antenna coupled to the gate of a second controlled rectifier and electromagnetically coupled via dielectric medium to said second transmitting antenna; said receiving antennae being adapted for receiving said pulses, whereby said gates are energized by said received received pulses, which render said controlled rectifiers conductive.

8. A trigger circuit as specified in claim 7 additionally comprising:

f. a first toroidal magnetizable core disposed about a main electrode of said first controlled rectifier;
g. a second toroidal magnetizable core disposed about a main electrode of said second controlled rectifier;
h. a first winding provided about said first core and connected in parallel with said first transmitting antenna; and
i. a second winding provided about said second core and connected in parallel with said second transmitting antenna.

* * * * *